United States Patent [19]
Doi

[11] Patent Number: 5,086,420
[45] Date of Patent: Feb. 4, 1992

[54] FOCUS CONTROL APPARATUS FOR USE WITH AN OPTICAL DISK FOR DETERMINING WHETHER A FOCUSED STATE HAS BEEN OBTAINED

[75] Inventor: Masanori Doi, Oume, Japan

[73] Assignee: Olympus Optical Co., Ltd., Tokyo, Japan

[21] Appl. No.: 563,733

[22] Filed: Aug. 6, 1990

Related U.S. Application Data

[63] Continuation of Ser. No. 178,941, Apr. 7, 1988, abandoned.

[30] Foreign Application Priority Data

Apr. 7, 1987 [JP] Japan ................................. 62-85529

[51] Int. Cl.[5] .............................................. G11B 7/00
[52] U.S. Cl. .................................................. 369/44.25
[58] Field of Search .............. 250/201 DF; 369/44.11, 369/44.25, 44.41, 44.42

[56] References Cited

U.S. PATENT DOCUMENTS

| | | | |
|---|---|---|---|
| 4,541,084 | 9/1985 | Oku et al. | 369/45 |
| 4,677,605 | 6/1987 | Abed | 369/45 |
| 4,701,603 | 10/1987 | Dakin et al. | 369/45 X |
| 4,747,089 | 5/1988 | Eguichi et al. | 369/45 |
| 4,755,980 | 7/1988 | Yoshimaru et al. | 369/45 X |
| 4,786,794 | 11/1988 | Doi | 369/45 X |
| 4,819,220 | 4/1989 | Miyazaki et al. | 369/45 |
| 4,866,688 | 9/1989 | Ohtake et al. | 369/46 X |

*Primary Examiner*—Robert L. Richardson
*Attorney, Agent, or Firm*—Armstrong, Nikaido, Marmelstein, Kubovcik, & Murray

[57] ABSTRACT

Disclosed is an optical disk apparatus in which light which returns from a recording medium is led to an photodetector composed of a plurality of light-receiving elements, and focusing is controlled on the basis of an focus error signal which corresponds to the relative distance between an objective and the recording medium. Whether the focusing pull has been conducted normally or not is determined by comparing a standard added signal level which is set by a focus search to the level of an added signal generated after the focusing pull has been conducted.

10 Claims, 5 Drawing Sheets

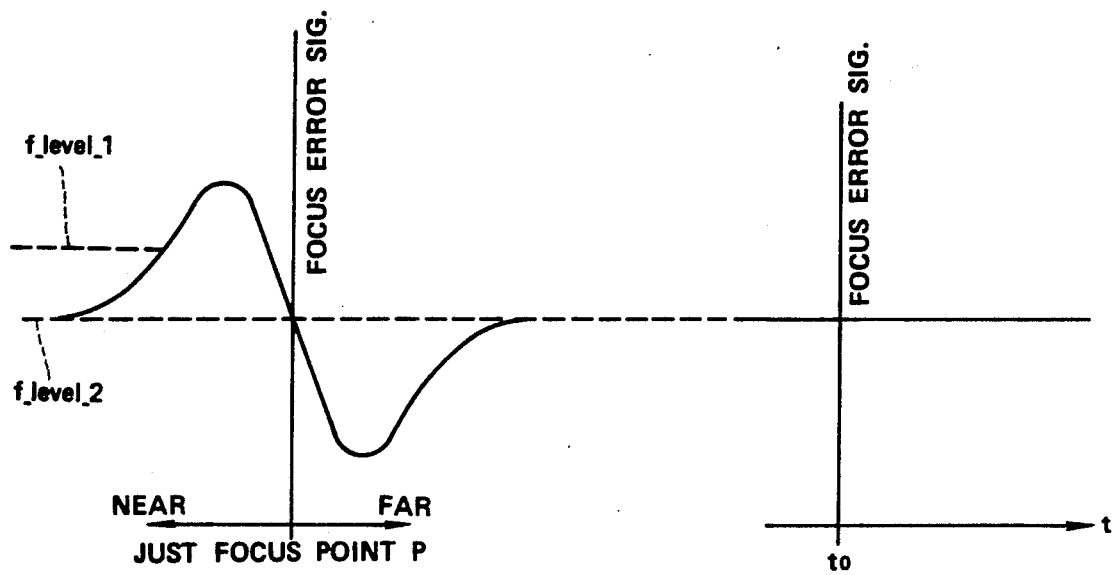
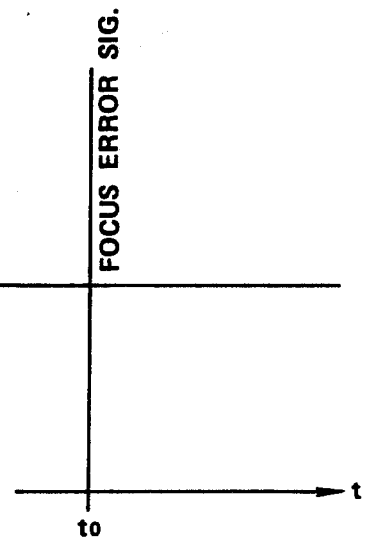
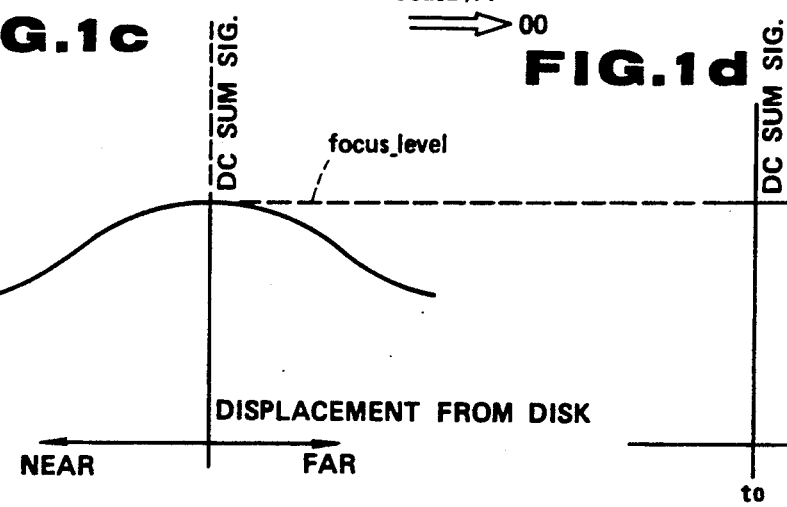
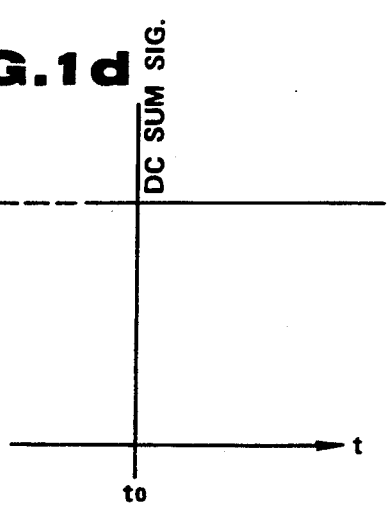

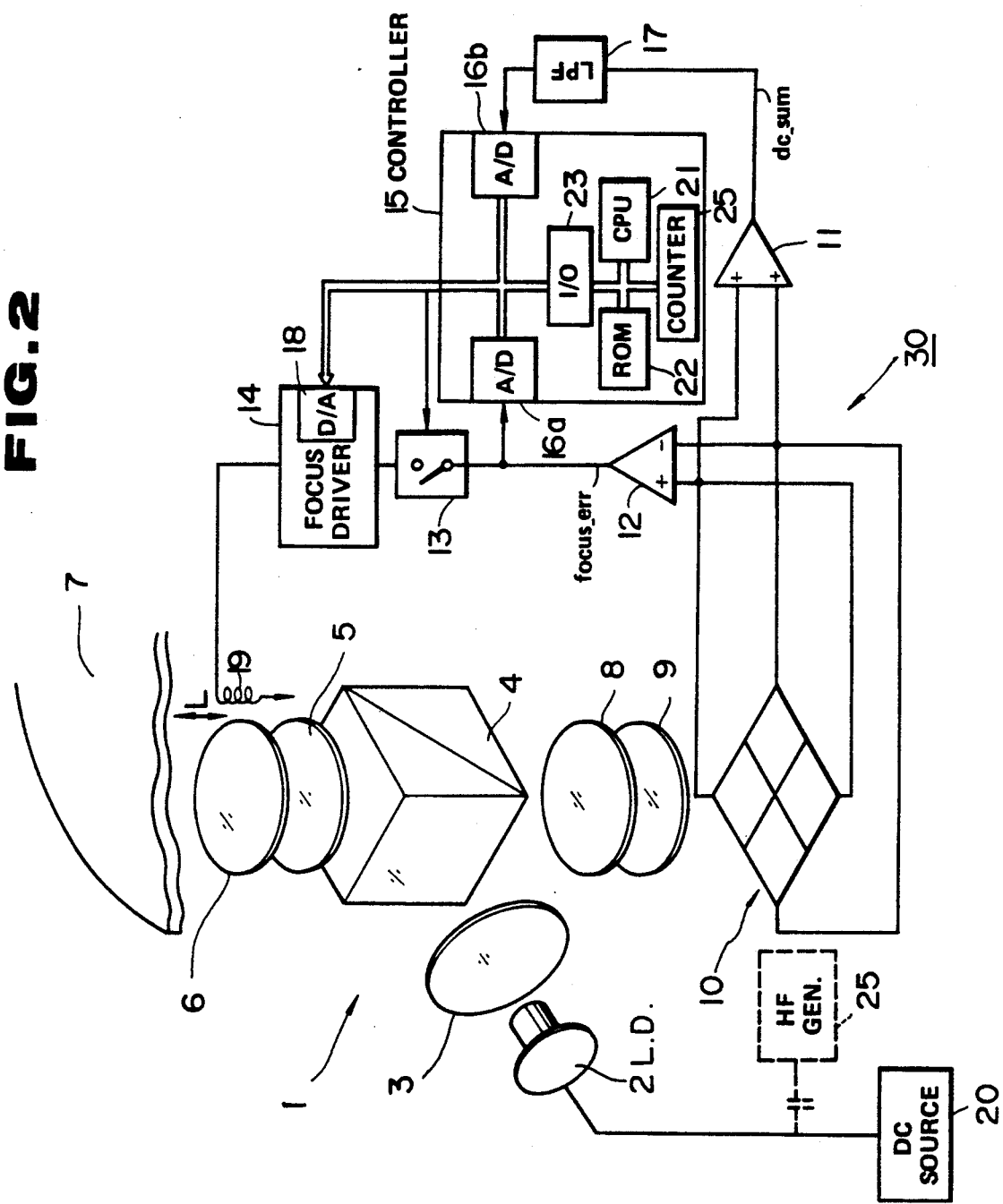

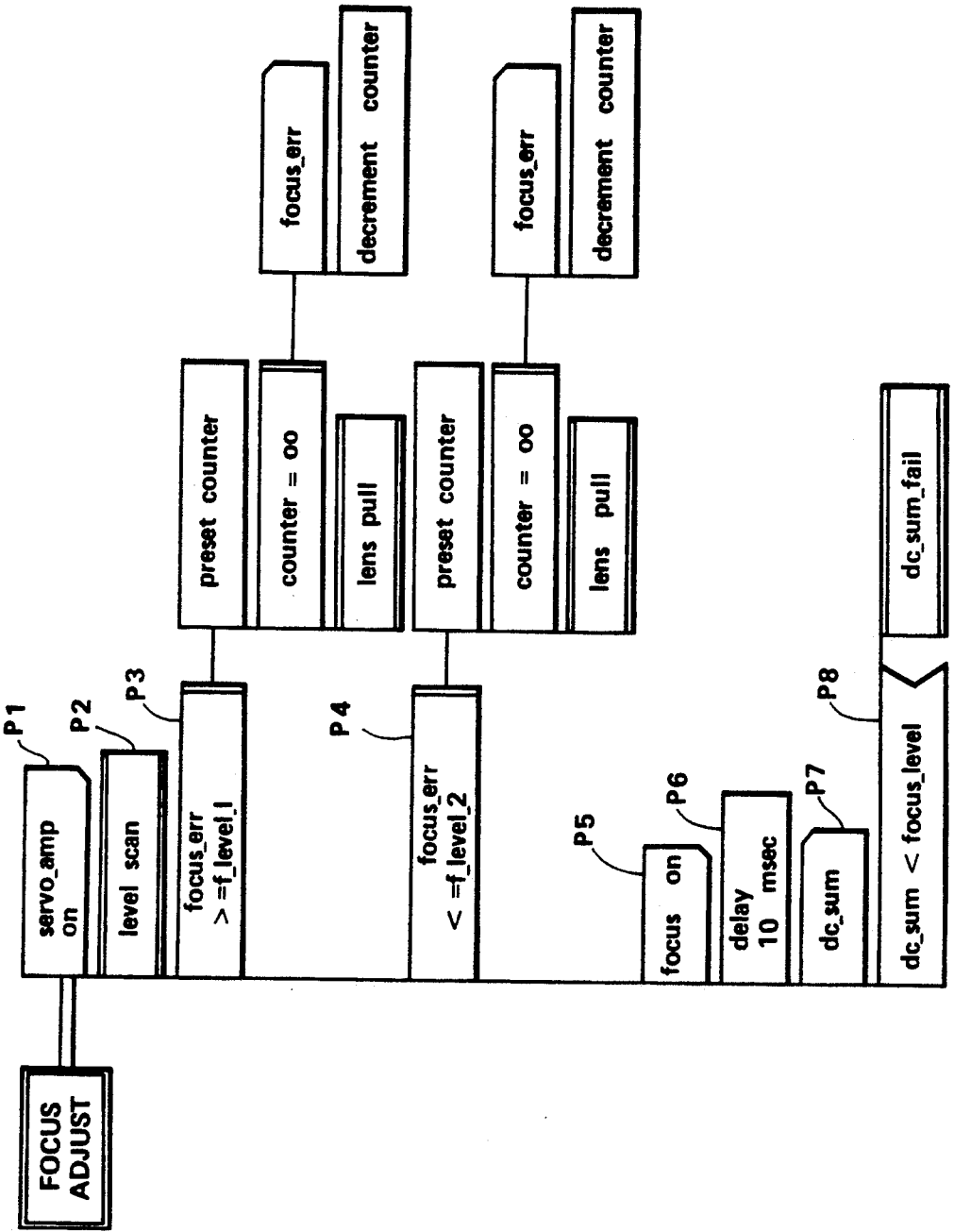

FOCUS CONTROL APPARATUS FOR USE WITH AN OPTICAL DISK FOR DETERMINING WHETHER A FOCUSED STATE HAS BEEN OBTAINED

This application is a continuation of application Ser. No. 178,941 filed Apr. 7, 1988 and now abandoned.

BACKGROUND OF THE INVENTION

1. Field of the Invention:

The present invention relates to an optical disk apparatus provided with means of determining whether or not a focusing pull has been conducted normally.

2. Description of the Related Art:

Recently, attention has been paid to optical information recording/reproducing apparatuses which by irradiating optical beams are capable of recording information on a recording medium at a high density and reproducing at high speed the information recorded on the recording medium at high density.

In such apparatuses, optical beams must be sufficiently stopped down when the information is recorded or reproduced because of the high density recording. For this reason, a focusing servo system is employed in which focusing of an objective lens for condensing the optical beams onto the recording medium is controlled so that recording or reproduction is performed in a focused state.

Such focus controlling techniques have been disclosed in the specification of, for example, Japanese Patent Laid-Open No. 63033/1984.

This technique utilizes the fact that the reproducing information signal is maximized in a state wherein the lens is focused, and involves focusing of the lens by the closing of a servo loop with the level of a focus error signal generated when the information reproducing signal is maximized serving as a desired value of the focusing servo system.

In this focusing control technique, the normal focusing state of the servo system is ensured if an optical system for irradiating optical beams of a light source onto the recording medium and leading light returning from the recording medium to a photo detector as well as the photo detector for outputting focus error signals are in a normal state. However, generally the optical system or the like is not always to be set in an optimum state. In such a case, the maximum level of an information reproducing signal does not coincide with the focused state. If the setting of the optical system or the like is outside a certain range of tolerance, the point at which the servo loop is closed deviates from the range in which a focusing pull is enabled, making it impossible for the optical system to be set in a focusing state. Even if the focusing pull is performed normally, if the position of the photo detector is shifted or if a subtracter for outputting focus error signals has an offset, the focused state of the servo system does not ensure an actual focused state, causing the beam to be condensed on the recording medium to be expanded and thereby reducing the reliability of recording/reproducing operations.

In consequence, the conventional optical information recording/reproducing apparatus of the above-described type has a disadvantage in that it does not offer a high level of reliability.

OBJECT AND SUMMARY OF THE INVENTION

Accordingly, an object of the present invention is to provide an optical disk apparatus capable of determining whether or not a focused state has been obtained.

Another object of the present invention is to provide a highly reliable optical disk apparatus.

FIGS. 1a through the 1d concept on which the present invention is based. As an objective lens is moved in a direction perpendicular to the disk surface in the vicinity of the focused point, a focus (error) signal such as that shown in FIG. 1a is generated, and an added signal (expressed as DC SUM SIG.) generated from light-receiving elements varies in the manner shown in FIG. 1b. More specifically, the focus error signal level becomes zero while the added signal has a peak value at a focused point (just focused position) P. In the above-described operational state, if the loop of the focusing servo system is closed at the time when the added signal is at the peak value, a normal focusing pull is performed. The focus error signal generated after a point $t_o$ at which the focusing pull is completed maintains zero level at the focused point P, that is, a state in which a focus signal is not shifted is maintained, as shown in FIG. 1c. The added signal generated after the focus pull has been completed maintains its peak value (focus level), as shown in FIG. 1d.

On the basis of the above-described concept, the present invention makes a decision as to whether or not the focusing pull has beem performed normally in the following manner:

The objective lens is moved in a direction perpendicular to the disk surface by an appropriate moving means through a suitable area including the focused point. While it is being moved, the focus error signal and the added signal are sampled so as to detect the maximum and minimum values of the focus error signal and the maximum value of the added signal, whereby the sampling operation is completed. Next, focusing pull is actually performed, and the level of the added signal generated in a focused state of the servo system which is obtained after the focusing pull has been performed is then compared with the maximum level of the added signal. If the difference thereof is within the accepted range of tolerance, it is determined that the focusing pull has been performed normally. If the difference is outside this tolerance, it is determined that the focusing servo system is abnormal, whereupon the flow proceeds to processes of abnormality processing. In this way, recording or reproducing is conducted only when a desired focused state of the servo system has been obtained which enables the apparatus to be maintained in a highly reliable condition.

BRIEF DESCRIPTION OF THE DRAWINGS

FIGS. 1a-1d illustrate the concept of the present invention;

FIG. 2 shows the structure of a first embodiment of the present invention;

FIG. 3 is a flowchart of the processing of the first embodiment which is expressed in the form of a problem analysis diagram called PAD;

DESCRIPTION OF THE PREFERRED EMBODIMENTS

Figure 4:
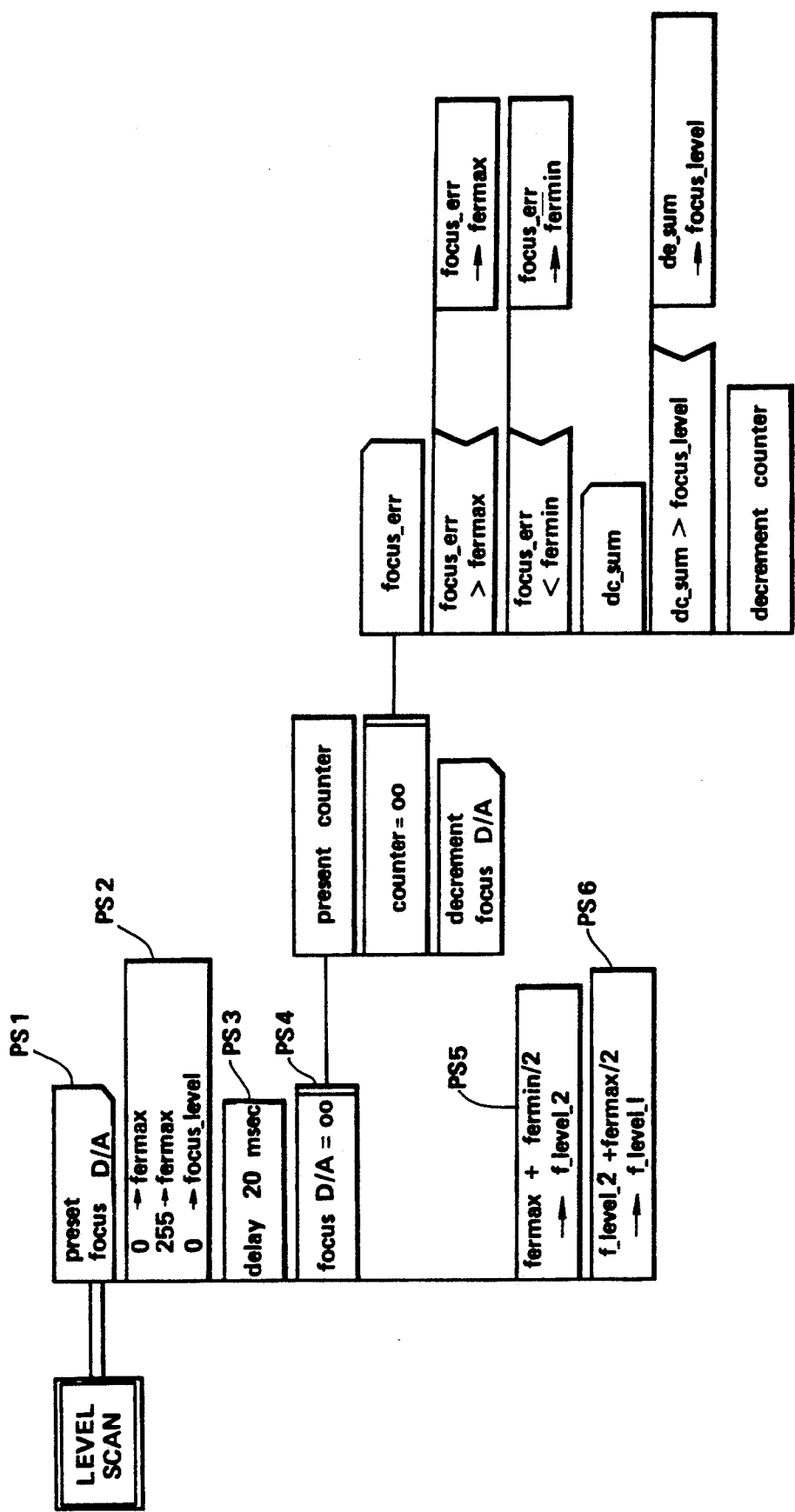
FIG. 4 is a flowchart of a level scanning processing which is expressed in the form of a problem analysis diagram.

A first embodiment of the present invention will be described below with reference to the accompanying drawings. An optical disk apparatus 30 of the first embodiment has an optical pickup 1 of the type shown in FIG. 2.

The laser beam of a laser diode 2 of the optical pickup 1 is condensed by a collimator 3 so as to create a beam made up of parallel rays of light. This beam made up of parallel rays of light is reflected substantially completely by a polarized beam splitter 4, and the reflected, linearly polarized light is changed into a circularly polarized light by a $\lambda/4$ plate 5. The circularly polarized light is then irradiated onto an optical disk 7 through an objective lens 6. The light reflected by the optical disk 7 is changed by the $\lambda/4$ plate 5 into a linearly polarized light which vibrates in a direction perpendicular to that in which the light illuminated onto the optical disk vibrates, and then becomes incident on the polarized beam splitter 4. The incident light is substantially completely transmitted by the polarized beam splitter 4, and is then received by a four-section photodetector 10 through a condenser lens 8 and a cylindrical lens 9 which comprise a focusing means by an astigmatical method.

The photodetector 10 is made up of four light-receiving elements, two of the light-receiving elements disposed in the diagonal direction making a pair. The outputs of the two pairs of light-receiving elements are respectively input to an adder 11 and a subtracter 12 so as to generate an added signal dc_sum and a subtracted signal (i.e., a focus error signal) focus_err.

The focus error signal focus_err which is output from the subtracter 12 is input to a focus driver 14 through an analog switch 13. It is also input to an A/D converter 16a within a controller 15.

The added signal dc_sum which is output from the adder 11 is passed through a low-frequency passing filter 17 by means of which its high-frequency noise components are filtered out, and is then input to an A/D converter 16b within the controller 15. The controller 15 has access to the D/A converter 18 within the focus driver 14 and thereby applies focus drive currents to a focus drive coil 19 which serves as an objective lens drive means so as to move the objective lens 6 in the direction indicated by L which is perpendicular to the disk 7. Power is supplied to the laser diode 2 from a dc power source 20.

Figure 5:
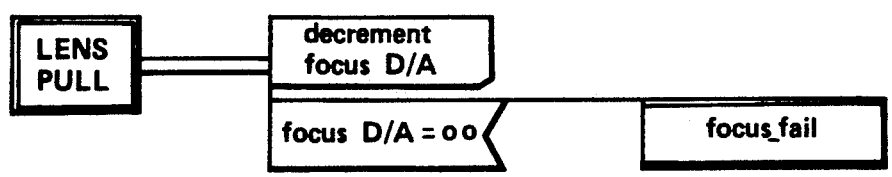
FIG. 5 is a flowchart of a lens pull processing which is expressed in the form of a problem analysis diagram.

The controller 15 incorporates a central processing unit 21 which is adapted to retrieve digital data converted by the A/D converters 16a and 16b through an I/O port 23, then to perform processings shown in FIGS. 3 to 5 using the focusing pull means which has been stored in a read-only-memory 22 previously. The controller 15 also incorporates a counter 24, and an operation RAM (not shown).

The united photodetector used to detect a focus error signal and an added signal may also be composed by two separate ones.

The operation of the first embodiment which is achieved by using the thus-arranged optical disk apparatus 30 will be described with reference to the problem analysis diagram shown in FIGS. 3 to 5.

Referring first to FIG. 3, the power is supplied to the drive circuit of a focus servo system by turning on a servoamplifier in step P1.

Next, in step P2 which is the preprocessing of the focus pull and is a level scanning processing, f_level_1, f_level_2, and focus—level are set as standard levels used when focus pull is conducted.

After the levels have been set in step P2, steps P3 and P4 are executed in succession so as to enable focus pull to be actually conducted.

More specifically, step P3 is executed by setting the objective lens 6 at a position which is to the left of that indicated by f_level_1 in FIG. 1 (at a position which is close to the optical disk 7 in FIG. 2) and by gradually moving it rightward (in the direction in which the objective lens 6 moves away from the disk), until the signal level exceeds a first determining level f_level_1 provided at the inclined portion of a wave form in FIG. 1a. Subsequently, step P4 is executed so as to compare the signal level to a second determining level f_level_2 until the former crosses the latter. When the signal level crosses the f_level_2, step P5 is executed in which the analog switch 13 shown in FIG. 2 is turned on so as to close the focus servo loop. As the focus servo loop is formed by turning on the analog switch 13, the focus error signal focus_err which is output from the photodetector 10 through the subtracter 12 is applied to the focus drive coil 19 through the focus driver 14. After the focus servo loop has been formed, execution of a subsequent process is delayed in step P6 for a period of, for example, 10 msec, during which time the stabilization of the focus servo loop is awaited. Next, in step P7, the added signal dc_sum is retrieved. The flow then proceeds to step P8, in which the added signal dc_sum is compared to the maximum value of the added signal, focus_level, obtained in step 2. If dc_sum < focus_level, it is determined that the normal focus state of the servomechanism has not been obtained, and the flow then goes to abnormality processing control processes. If dc_sum = focus_level, it is determined that the normal focus state has been achieved, whereupon the operation proceeds to the reproduction or recording mode.

Next, the steps P2 to P8 will be described in detail.

Step 2, which is the level scanning process, is executed to ensure that a suitable determination is made with respect to various types of disk which have a variety of characteristics in terms of reflected light or the like, and involves setting of the first determinng level f_level_1 used to conduct focusing pull smoothly, the second determining level f_level_2 used to determine the timing at which the focus state of the servo system is to be turned on, and the maximum level of the added signal focus_level (dc_sum_max).

The level scanning processing step P2 will be described in detail with reference to FIG. 4.

First, in step PS1, an initail value is output to the D/A converter of the focus driver 14 so as to locate the objective lens 6 at a position which is close to the disk 7 (locate the objective at least at a position which is closer to the disk than the position which corresponds to the first determining level f_level_1 in FIG. 1a).

Next, in step PS2, the maximum and minimum values of the focus error signal and the maximum value of the added signal are initialized. That is, a digital value 0 is assigned to the maximum value fermax of the focus error signal, a digital value 255 is assigned to the minimum value fermin of the focus error signal (in a case where an 8-bit processing system is used), and a digital value 0 is assigned to the maximum value focus_level of the added signal. Subsequently, execution of a subsequent process is delayed in step PS3 for a period of, for example, 20 msec, thus allowing time for vibration of the objective lens 6 to cease.

Next, in step PS4, while the objective lens 6 is gradually driven in the direction in which it moves away from the disk 7, the focus error signal is sampled so as to enable updating of the maximum and minimum values of fermax and fermin of the focus error signal which are contained in the registers of the central processing unit 21 of the controller 15. Similarly, the added signal is sampled so as to enable updating of the maximum value focus_level of the stored added signal.

For these purposes, the initial value of the counter 25 incorporated within the controller 15 is first preset to a suitable value. Next, the focus error signal is retrieved until the count of the counter becomes zero, the retrieved focus error signal focus_err being compared with the preset maximum value fermax of the focus error signal. If focus_err > fermax, the signal focus_err is substituted for fermax (fermax is updated). If not, no substitution takes place. Similarly, the focus error signal focus_err is compared with the minimum value fermin of the focus error signal. If focus_err < fermin, fermin is updated. If not, no updating takes place. Furthermore, the added signal dc_sum is retrieved, and, if the added signal dc_sum > focus_level, the added signal dc_sum is substituted for the focus level. If not, no substitution takes place. Subsequently, the count of the counter 25 is decremented, and the focus_err is retrieved on condition that the count of the counter 25 is not zero so as to enable execution of comparison and updating or non-updating processes. When the count of the counter 25 is decremented to zero, the value of the focus drive signal which is output to the focus driver 14 is decreased by a suitable value so as to move the objective 6. Thereafter, initialization of the counter 25 and the subsequent operations are repeated until the value of the focus drive signal which is output to the focus driver 14 becomes zero, i.e., until the objective 6 passes through the focused position, then reaches a position which is further than the focused position. In this way, the objective 6 is scanned in the entire range which contains the focused point thereof (just focused position), whereby basic data used to determine the determining levels f_level_1, f_level_2, and focus_level are obtained from the sampled values.

After the maximum value fermax and the minimum value fermin of the focus error signal shown in FIG. 1a, and the maximum value focus_level of the added signal shown in FIG. 1b have been obtained in the above-described manner for an optical disk 7 actually being used, the second determining level f_level_2, i.e., f_level_2 = fermax + fermin/2, and the first determining level f_level_1, i.e., f_level_1 = f_level_2 + fermax/2, are respectively determined in the subsequent steps PS5 and PS6 in that order.

After the determining levels f_level_1 and f_level_2 and the maximum value focus_level of the added signal have been set in the processes shown in FIG. 4, actual focusing pull is conducted in step P3 which is shown in FIG. 3.

First, the objective 6 is set at the position at which it is located when level scanning thereof is started. While the focus error signal retrieved in that state is being compared to the first determining level f_level_1, the objective lens 6 is moved by the lens pull processing until the retrieved focus error signal exceeds the first determining level f_level_1.

FIG. 5 shows the lens pull processing.

When the objective lens 6 is at an initial position, the focus drive signal which is output to the focus driver is decremented, and it is then determined whether or not that focus drive signal is zero. If the answer is yes, it is determined that the focusing pull operation has failed, and the flow then goes to abnormality processing. If not, the subsequent operation is executed.

After the lens 6 has been moved by the lens pull processing, the counter 25 is initialized again, and it is then determined whether or not the count of the counter 25 is zero. If not, the focus error signal is retrieved, and the count of the counter 25 is then decremented. Thus, determination of the count of the counter 25, retrieval of the focus error signal, and decrementing of the count of the counter 25 are repeated until the count of the counter 25 becomes zero. Once the count of the counter 25 is at zero, the lens 6 is moved by the lens pull processing. Thereafter, the same operation is repeated until the count of the counter 25 becomes zero. After the focus error signal has exceeded the first determining level f_level_1, similar processing is executed in step P4 until the focus error signal becomes smaller than the second determining level f_level_2.

Once the focus error signal focus_err is equal to or is smaller than the determining lever f_level_2 by step P4, the flow goes to a step P5 in which the focusing servomechanism is turned on by closing the analog switch 13.

After the focusing servo has been turned on, the subsequent process is delayed in step P6 until the loop of the focusing servomechanism becomes stabilized. Subsequently, in step P7, the added signal is sampled, and the fetched added signal dc_sum is then compared to the maximum value focus_level of the added signal which has been obtained in the level scanning processing, in step P8. If dc_sum ≧ focus_level, it is determined that the normal focused state has been obtained, and the apparatus gets ready for accepting (enabling) recording or reproducing operation.

If dc_sum < focus_level, it is determined that the normal focused state has not been achieved, then the flow goes to abnormality processing control processes.

In the first embodiment, determination is made as to whether or not the added signal obtained when the lens is focused is equal to the maximum level of the added signal. Therefore, the objective 6 is maintained in the focused state by the servomechanism by the above-described processes. Further, the level of the added signal is maximized in that focused state, by which the optimum recording or reproduction is ensured.

In the above-described embodiment, the added signal generated in the focused state is retrieved, and if the added signal is at a level smaller than the maximum level, it is determined that the focused state is abnormal. Therefore, fail of the focusing pull can be detected, and recording or reproduction in a state where the apparatus is not in an optimum state (which does not offer a high level of reliability) can be prevented.

In the first embodiment, it is determined that the focused state is abnormal when dc_sum < focus_level, in step P8. However, the added signal may be slightly deviated from the maximum value when the lens is focused. If it causes no problem, a step P8' shown in FIG. 6 may be executed.

More specifically, while it may be determined that the focused state is not allowable and the abnormality processing may be executed only when the result of the comparison between the added signal $dc_{13}$ sum retrieved when the lens is focused and the maximum value focus_level of the added signal is dc_sum < focus_level − $\alpha$, it may be determined that the focused state is normal when dc_sum ≧ focus_level − $\alpha$, where $\alpha$ represents a value which is relatively and sufficiently smaller than the focus_level. The $\alpha$ may be set in accordance with the required reliability of the apparatus.

Application of the present invention is not limited to the optical pickup constructed in the manner shown in FIG. 2, but the present invention may be applied to a wide variety of optical type information recording/reproducing apparatus in which an optical beam is focusing-controlled. For example, it may be applied to a punching type, a photo-electro-magnetic, and other types of optical recording/reproducing/erasing apparatuses.

In an optical system designed in a specific way, only a predetermined percentage of light returns from the optical disk to the light source. In that case, the added signal dc_sum is decreased in the vicinity of the focused point, and becomes the peak value at the two sides thereof.

In such a system, it is therefore difficult to make a determination as to whether or not the focused point is reached using the set focus_level.

In that case, a high frequency may be superimposed to the output of the laser diode 2 which serves as a light source (in addition to the dc power source 20 which drives the laser diode 2, a high-frequency (oscillating) power source 25 indicated by the dotted line in FIG. 2 may be incorporated so as to enable its output to be superimposed to the current output of the dc power source) so as to prevent a decrease in the added signal that takes place in the vicinity of the focused point and thereby enable determination as to whether or not the focusing pull is normal to be made in accordance with the present embodiment.

Figure 6:
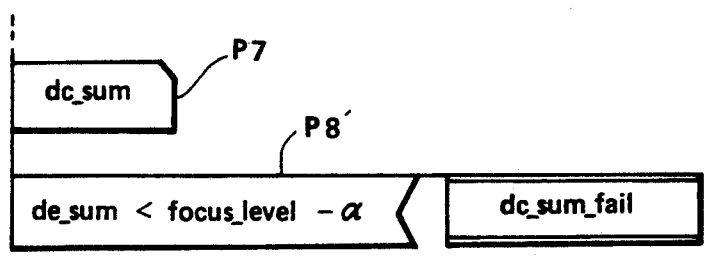
FIG. 6 is a flowchart of the main processes of a determining processing of a second embodiment of the present invention which is expressed in the form of a problem analysis diagram.
Figure 7:
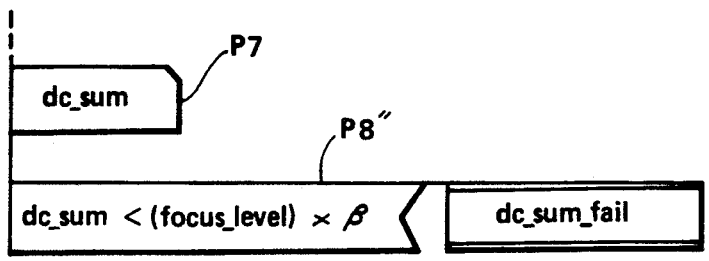
FIG. 7 is a flowchart of the main processes of a determining processing of a third embodiment of the present invention which is expressed in the form of a problem analysis diagram.

In the process shown in FIG. 6, it is determined whether or not the level of dc_sum is larger than focus_level − $\alpha$ so as to determine if the focusing pull is in a normal state or not. However, it may be determined by determining whether or not dc_sum < (focus_level) × $\beta$, like a step P8″ shown in FIG. 7, where $\beta$ is equal to or is smaller than 1 and its lower limit is a value (in general, a value which is close to 1) determined by the focusing range.

In place of the maximum value of the added signal, an added signal generated when the servo loop is closed may be utilized. Thus, if an added signal which is generated before the servo loop is formed and is used as a standard for the logical determination is compared with an added signal generated after the servo loop has been formed, it is possible to know the state obtained after the servo loop has been formed with a high degree of accuracy.

In the above-described embodiments, the peak of the added signal is the maximum value thereof. However, it may be the minimum value owing to the output characteristics of the added signal. It is to be noted that the present invention can be applied to such a case.

As will be understood from the foregoing description, in the present invention, the peak value of the added signal is obtained by actually scanning the objective, and the thus-obtained peak value is compared to an added signal obtained in an actually focused state so as to determine whether or not the focused state is normal. In consequence, it is possible to make a determination as to whether or not the focusing pull has been conducted regardless of variations in the amount of light which is reflected from the disk.

What is claimed is:

1. An optical disk apparatus comprising:
   optical beam generating means for outputting an optical beam;
   an objective lens condensing said optical beam;
   an optical recording medium onto which a condensed optical beam is irradiated;
   a lens actuator moving said objective lens in a direction perpendicular to a surface of said recording medium by a signal applied thereto;
   focus error signal outputting means for detecting light returning from said recording medium and therein generating a focus error signal which corresponds to a relative distance between said objective lens and said recording medium;
   added signal generating means for detecting the light returning from said recording medium and for outputting a signal representing a total amount of said light;
   means for outputting a lens moving signal to said lens actuator to move said objective lens;
   means for setting first and second predetermined standard levels, said first standard level representing a desired value of said focus error signal and said second level representing a desired value of said signal representing the total amount of said light;
   a first judging means for comparing said generated focus error signal with said first predetermined standard level while said lens moving signal is being output;
   means for controlling a focusing pull timing of applying said focus error signal to said lens actuator by a judging signal from said first judging means; and
   a second judging means for determining whether or not a focused state has been obtained by comparing said signal representing the total amount of light to said second predetermined standard level after the focusing pull has been completed.

2. An optical apparatus according to claim 1, wherein said focus error signal outputting means comprises a cylindrical lens for astigmatically focusing said light returning from said recording medium.

3. An optical disk apparatus according to claim 1, wherein said first predetermined standard level employed by said first judging means comprises a plurality of predetermined levels.

4. An optical disk apparatus according to claim 3, wherein said plurality of predetermined levels are set to correspond to a maximum value fmax and a minimum value fmin of a focus error signal generated from said focus error signal outputting means when said lens moving signal is output.

5. An optical disk apparatus according to claim 1, wherein said second predetermined standard level used by said second judging means is set to correspond to a peak value d of an added signal output from said added signal generating means when said lens moving signal is output.

6. An optical disk apparatus according to claim 5, wherein said second predetermined standard level has a plurality of levels including a maximum value dmax and a minimum value dmin of said added signal.

7. An optical disk apparatus according to claim 5, wherein said second predetermined standard level is set at a value dmax$-\alpha$, and which is deviated from the peak value of said added signal, where $\alpha$ represents a value which is relatively smaller than the peak value d and which is based on the reliability of the optical disk apparatus.

8. An optical disk apparatus according to claim 5 wherein said second predetermined standard level is set at a value dmax$\times\beta$ obtained by multiplying the peak value d of said added signal by a factor $\beta$ which is based on a focusing range and is smaller than 1 and is close to 1.

9. An optical disk apparatus according to claim 1, wherein said optical beam generating means incorporates a laser diode.

10. An optical disk apparatus according to claim 9, wherein said laser diode is driven by a current from a dc power source which is superimposed by a high-frequency.

* * * * *